Oct. 31, 1944. E. N. JACOBI 2,361,630
AUTOMOBILE DIRECTION SIGNALS
Original Filed Feb. 20, 1939   2 Sheets-Sheet 1

Inventor
Edward N. Jacobi

Oct. 31, 1944.  E. N. JACOBI  2,361,630
AUTOMOBILE DIRECTION SIGNALS
Original Filed Feb. 20, 1939  2 Sheets-Sheet 2
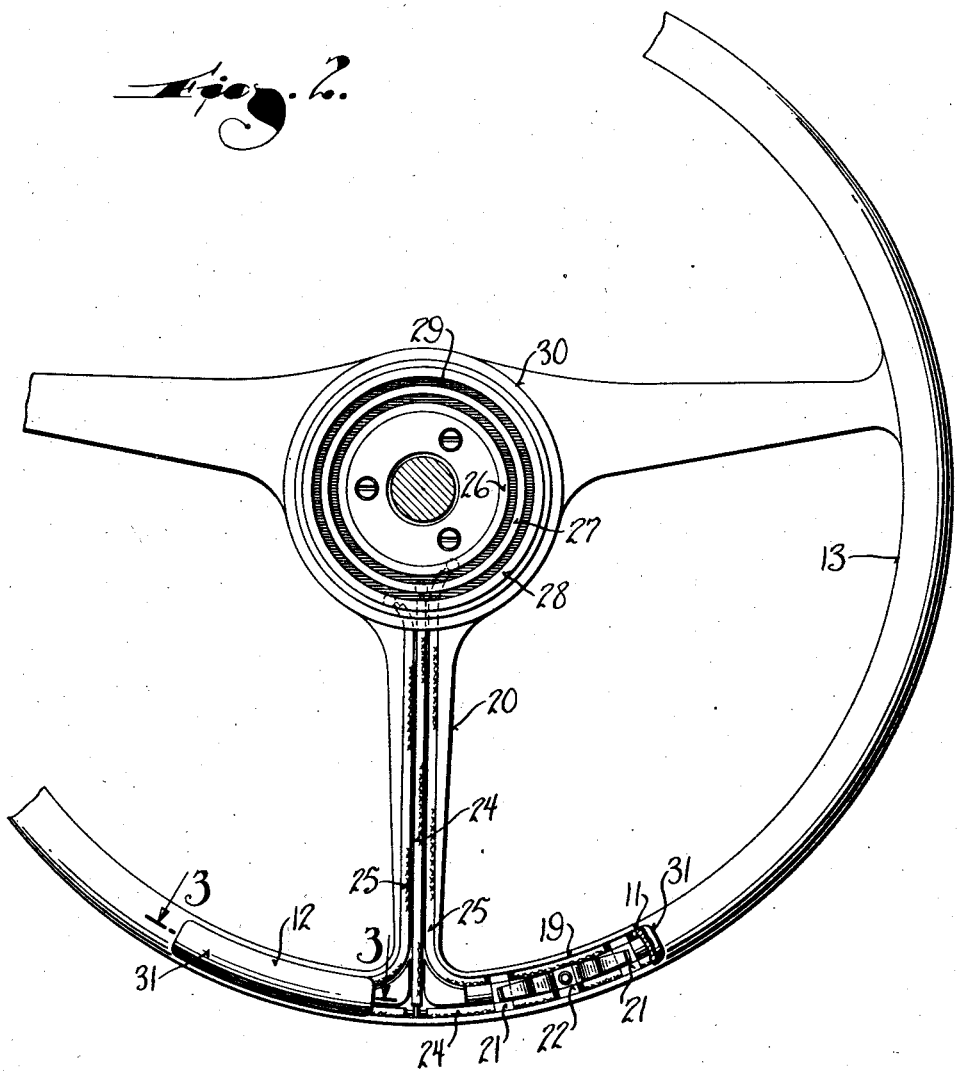
Inventor
Edward N. Jacobi Patented Oct. 31, 1944

2,361,630

UNITED STATES PATENT OFFICE 2,361,630

AUTOMOBILE DIRECTION SIGNALS

Edward N. Jacobi, Milwaukee, Wis., assignor to Briggs & Stratton Corporation, Milwaukee, Wis., a corporation of Delaware Original application February 20, 1939, Serial No. 257,436. Divided and this application April 24, 1941, Serial No. 390,155

6 Claims. (Cl. 177—339)

This invention relates to automobile "right" and "left" turn direction signals, and is a division of the copending application of Edward N. Jacobi, Serial No. 257,436, filed February 20, 1939, now Patent No. 2,291,159. Such turn signals are usually mounted on the back of an automobile and controlled by the driver to visually indicate the intended direction of travel.

In general, the invention consists in the provision of two electrically lighted signals on the rear of the automobile and electric circuits for lighting these signals upon closure of switches mounted on the steering wheel, and one of the objects of this invention is to provide a novel and improved switch construction so designed that the switch will be closed without conscious effort on the part of the driver and without distracting his attention in any way.

Another object is to enable the operator of a vehicle equipped with this invention to signal a turn in advance of the actual change in direction of the vehicle merely by changing his grip on the steering wheel preparatory to turning.

More specifically, it is an object of this invention to provide independent switches in the rim of an automobile steering wheel which are closed by grip-like actuators having portions thereof projecting slightly beyond the surface of the rim at points not usually gripped by the driver during normal forward travel of the automobile.

Another object of this invention is to provide a signal device for automobiles to designate "right" and "left" turns, which incorporates means for cancelling both signals in the event the driver unintentionally closes both of the controlling switches.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 2 is a view of the underside of a portion of the steering wheel, with part of one of the switch actuators broken away.

Figure 1:
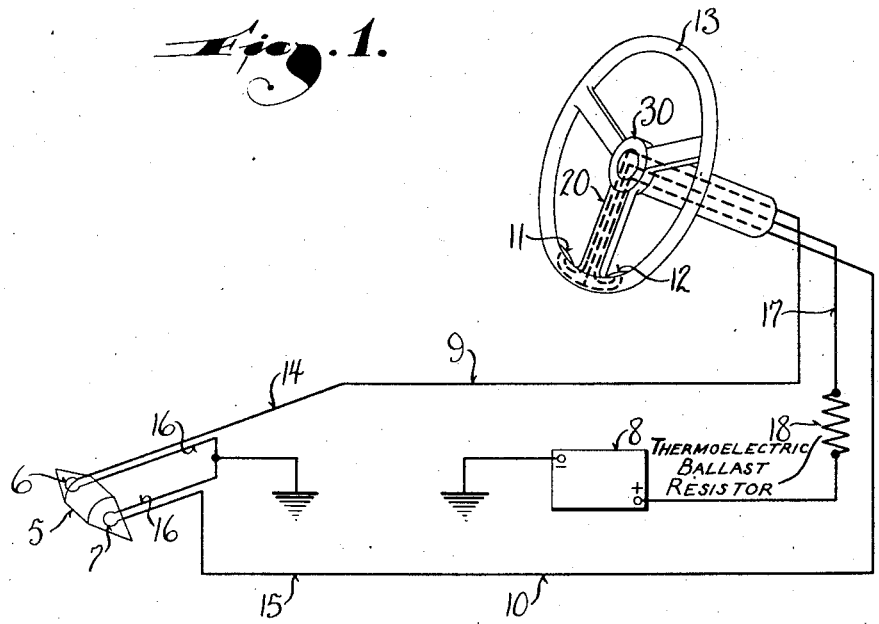
Figure 1 is a diagrammatic view illustrating the complete signal system.
Figure 3:
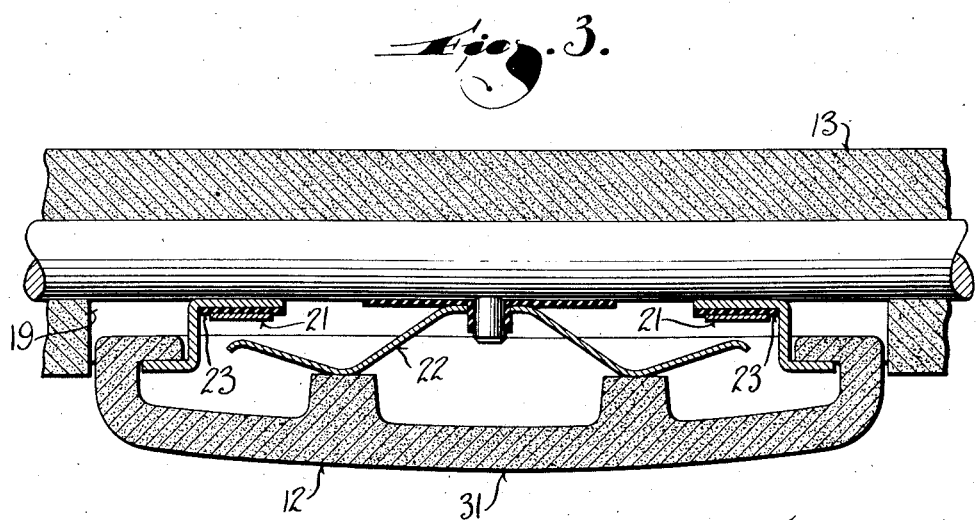
Figure 3 is a sectional view through one of the switches taken on the plane of the line 3—3 in Figure 2.

Referring now particularly to the accompanying drawings in which like numerals indicate like parts throughout the several views, the numeral 5 designates a "right" and "left" turn signal of the type adapted to be mounted on the rear of an automobile. The signal is rendered operative by the illumination of either of two electric lamps 6 and 7, the former being lighted to designate a "left" turn, and the latter being lighted to designate a "right" turn.

While the signal has been illustrated as a single unit embodying both lamps 6 and 7, it is to be understood that separate units for each lamp may be employed. In this latter instance the separate units could readily be mounted one at each side of the rear of the vehicle. It is also to be appreciated that various other types of electrically operated signals other than lamps could be used to equal advantage.

The lamps 6 and 7 are connected with the battery 8 of the automobile through circuits 9 and 10 upon closure of separate "left" and "right" switches 11 and 12 respectively, mounted on the rim of the steering wheel 13.

The two circuits 9 and 10 comprise conductors 14 and 15, each connected with one side of the filament of the lamps 6 and 7, respectively, the opposite sides of the filaments of the lamps being grounded by conductors 16.

The two conductors 14 and 15 and the switches connect the lamps with the battery 8 upon actuation of either switch through a common return lead 17 in which a thermo-electric ballast resistor 18 is connected.

This ballast resistor is wound with iron wire and has such electrical characteristics that the current flowing in one of the circuits to light one of the signal lamps does not materially alter its resistance so that when only one circuit is closed by actuation of its respective switch, the resistor has no effect.

However, the increased current flowing through the resistor in consequence to simultaneous closure of both switches quickly increases its resistance to the point where the current flowing in both circuits is limited to an extent preventing the simultaneous lighting of the signal lamps 6 and 7. Hence, the ballast resistor functions to cancel both signals in the event the driver should unintentionally close both switches 11 and 12.

The specific construction of the switches forms the subject matter of the aforementioned copending application, Serial No. 257,436, filed February 20, 1939, and will be only briefly referred to herein.

The most important feature of these switches is that they make the control of the signal more practical by enabling the driver to render the proper signal operative without conscious effort and as a mere incident to normal driving practice.

This follows from the fact that the switches are mounted on the rim of the steering wheel which for this purpose is provided with a pair of cavities 19, one on each side of the normally vertical or downwardly extending spoke 20 of the steering wheel. Thus, it will be noted that the switches which are received in these cavities so as to be embedded in the rim are held circumferentially spaced on the steering wheel rim at points usually grasped by the operator of the vehicle in negotiating turns.

The switches are so constructed that each operates when grasped by the operator immediately prior to making a turn to complete a circuit to one of the turn signal lamps at the rear of the vehicle to thereby indicate the direction of the turn.

Each switch, as described in detail in the aforementioned copending application, consists of one or more, and preferably two, stationary contacts 21 and a movable contactor 22. The stationary contacts 21 are held in the bottoms of the cavities 19 but are insulated from the metal core of the rim which forms the bottom of the cavity by insulation 23.

These stationary contacts are held in place by the conductor wires 24 and 25 by which the stationary contacts and the movable contactor, respectively, are connected with the controlling circuits 9 and 10.

The conductor 24 is connected with the movable contactor 22 of each switch and is therefore common to both of the switches, and also connects with the common return lead 17 in a manner hereinafter described.

A separate conductor 25, however, is provided for each switch. These conductors are electrically joined to the stationary contactors 21 of each of the switches, and connect with the conductors 14 and 15 of the circuits 9 and 10 leading to the filament of the "left" and "right" lamps, respectively, in a manner now about to be described.

The conductors 24 and 25 are connected with the circuit conductors 14 and 15 and with the common lead 17 in any suitable manner, but in the present instance collector rings 26, 27 and 28 mounted in an insulated hub 29 are provided. The hub 29 is secured to the metal hub 30 of the wheel proper to which the inner ends of the spokes are joined.

The construction of the collector rings is fully described in the aforementioned copending application and forms no part of the present invention.

It is sufficient to state that the inner ring 26 has the conductor 25 of the "left" switch 11 connected therewith, and also the conductor 14 of the circuit 9; the outer ring 28 has the conductor 25 of the "right" switch 12 connected therewith and the conductor 15 of the circuit 10, and the center ring 27 has the common conductor 24 connected therewith and also the return lead 17 which leads to the battery.

Each of the switches 11 and 12 is provided with an actuator 31 overlying the movable contactor 22 and depressible into the cavity in the rim when gripped by the operator of the vehicle in negotiating turns to engage the movable contactor of the switch thus gripped with the stationary contacts to complete the circuit to one of the signal lamps.

Thus it will be seen that by providing two separate switches each with its own actuator, and by mounting or embedding the switches in the rim of the steering wheel one at each side of the normally vertical spoke at the bottom of the wheel, the operator need not exert any conscious effort to indicate a turn, as the actuators are located at points where the wheel is usually gripped by the operator in negotiating a turn. Likewise, the individual switches are useful in signalling turns in advance of the actual change in direction of the vehicle.

From the foregoing description, taken in connection with the accompanying drawings, it will be readily apparent that this invention provides a novel and highly practical direction signal system for automobiles and that the manner in which the control switches are mounted makes the control of the signal more or less automatic by eliminating the necessity for conscious effort on the part of the driver.

In addition, the location of the control switches insures the proper signal being given in advance of the actual change in direction of the vehicle. It is also to be appreciated that the thermo-electric ballast resistor effectively prevents simultaneous illumination of the signal lamps in the event the steering wheel switches are accidentally depressed at the same time by cancelling both switch signals.

What I claim as my invention is:

1. In an automotive vehicle having a source of electric current: electrical "right" and "left" turn signals on the vehicle, said signals being rendered operative by connection with the source of electric current; independent manual switches operable sequentially or simultaneously for connecting each of said signals with the current source so that both of said signals may be inadvertently simultaneously connected with the current source; and means operable in consequence to such inadvertent connection of both signals with the current source for limiting the strength of the current to the signals to less than twice the strength necessary to energize one signal whereby both signals are erased until one switch is opened.

2. In an automotive vehicle having a source of electric current: electrical "right" and "left" turn signals; separate electric circuits for connecting the signals with the current source; independent manual "right" and "left" switches operable sequentially or simultaneously for controlling the circuits so that both of said signals are subject to being simultaneously connected with the current source by inadvertent simultaneous closure of both switches; and current sensitive means common to both of said circuits for reducing the current available to the signals to stop both signals in the event both switches are simultaneously closed and to restore one signal upon opening of the switch corresponding to the other signal.

3. In an automotive vehicle having a steering wheel and a source of electric current: electric "right" and "left" turn signals; separate circuits for connecting the signals with the current source; independent manual "right" and "left" switches operable sequentially or concurrently mounted on the steering wheel in the ranges usually grasped by the driver when preparing to execute "right" and "left" turns so that actuation of the proper switch is generally effected without conscious effort, said switches being connected in the circuits for controlling the connection of the signals with the current source; and current sensitive means connected with said circuits and operable by the increased current resulting from concurrent closure of both switches to reduce the current flow in the circuits to less than the minimum operative current and thereby preclude continued simultaneous operation of both signals in the event both switches are accidentally concurrently actuated.

4. In an automotive vehicle having a steering wheel and a source of electric current: electric "right" and "left" turn signals; circuits for connecting the signals with the current source; independent manual "right" and "left" switches operable sequentially or concurrently mounted on the steering wheel in the ranges usually grasped by the driver when preparing to execute "right" and "left" turns so that actuation of the proper switch is generally effected without conscious effort, each of said switches being connected in one of the circuits for controlling the connection of its respective signal with the current source; and a thermoelectric ballast resistor connected with said signal circuits to carry the current of both of said signal circuits and operable in response to the increased current flowing as a result of concurrent closure of both switches to immediately erase both signals in the event both switches are accidentally concurrently actuated.

5. In a signalling system requiring at least two signals and separate switches therefor: a source of electric current; a plurality of electric signals; a circuit for each signal for connecting the same with the current source; a manually operable switch spring biased to open position in each of said circuits for closing the same and rendering the signal therein operative and open the circuit immediately upon removal of the manual operating force; said switches being adapted for separate actuation but by the character of their use being subject to the liability of concurrent closure; and current sensitive means common to said circuits and operable by the increased current through said current sensitive means due to concurrent connection of two signals with the current source to reduce the current available to the signals below the minimum operative value and thus erase the operated signals.

6. In an electrical control system having a plurality of circuits containing electrically energizable instrumentalities adapted to be energized by a predetermined minimum current and each circuit including a switch for closing the circuit, characterized by: the provision of a current sensitive device common to said circuits so that current to the instrumentalities is under the control of said current sensitive device which is unaffected by the current needed to energize the instrumentalities of one circuit but is operable by the increased current resulting from concurrent closure of two circuits to reduce the current available to the instrumentalities below said predetermined value and thus render inactive the instrumentalities energized as a result of concurrent closure of two switches.

EDWARD N. JACOBI.